3,131,218
N-AMINO GUANIDINE DERIVATIVES
Robert Geoffrey William Spickett, Harpenden, Graham John Durant, Welwyn Garden City, and Patrick Michael Guy Bavin, Letchworth, England, assignors to Smith Kline & French Laboratories, Philadelphia, Pa., a corporation of Pennsylvania
No Drawing. Filed Feb. 7, 1962, Ser. No. 171,592
Claims priority, application Great Britain Feb. 15, 1961
7 Claims. (Cl. 260—564)

This invention relates to new N-amino guanidine derivatives having pharmacological activity, in particular having anti-inflammatory activity. In addition compounds of this invention are blockers of the sympathetic nervous system and hypotensive agents.

The novel N-amino guanidine derivatives of this invention are represented by the following structural formula:

Formula I $$Ar-Y-A-NHC \underset{NHNH_2}{\overset{NH}{\diagup\!\!\!\diagdown}}$$

wherein:
Ar is naphthyl or

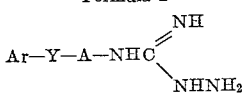

Y is O, S, or NR;
A is an alkylene chain of 2 to 4 carbon atoms having at least 2 carbon atoms separating the hetero atoms to which it is attached;
R is hydrogen or lower alkyl; and
$R_1$, $R_2$ and $R_3$ are hydrogen, lower alkyl, lower alkoxy or halogen.

The preferred compounds of this invention are those of Formula I in which Y is oxygen.

Advantageous compounds of this invention have the following structural formula:

Formula II

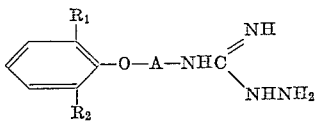

wherein:
A is an alkylene chain of 2 to 4 carbon atoms having at least 2 carbon atoms separating the hetero atoms to which it is attached, and
$R_1$ and $R_2$ are lower alkyl, lower alkoxy or halogen.

A particularly advantageous and preferred compound is N-amino-N'-[2-(2,6-xylyloxy)ethyl]guanidine.

The terms "lower alkyl" and "lower alkoxy" where used herein denote groups having 1 to 4 carbon atoms, preferably one carbon atom.

This invention also includes pharmaceutically acceptable salts of the above defined bases formed with nontoxic organic or inorganic acids. Suitable organic acids are, for example, maleic, fumaric, ascorbic, acetic, citric, methane sulfonic, ethane disulfonic and benzene sulfonic. Exemplary of the preferred inorganic salts are those with hydrochloric, hydrobromic, hydriodic, phosphoric and sulfuric acids. The compounds of this invention can be isolated as their inorganic salts. A salt can be converted into the free base by treatment of a solution of the salt in ethanol with a base such as sodium ethoxide. The free base can be converted into other pharmaceutically acceptable, nontoxic, acid addition salts by treating with the appropriate organic or inorganic acid advantageously in a solvent such as ethanol, ether or acetone.

The N-amino guanidines of this invention are prepared according to the following procedure:

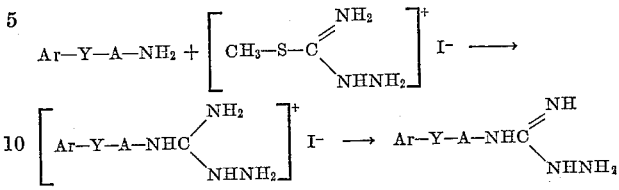

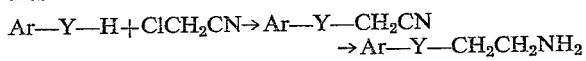

The terms Ar, Y and A are as defined hereabove.

The 2-substituted-ethylamine starting material is reacted with an S-methyl isothiosemicarbazide salt such as, preferably, the hydriodide salt. The reaction is advantageously carried out in alcohol such as ethanol or methanol at elevated temperature such as at the reflux temperature of the reaction mixture for about 1 to 24 hours preferably from about 2 to 6 hours. The hydriodide salt of the N-amino guanidine is isolated and converted to the free base by treatment with ethanolic sodium ethoxide.

The 2-substituted-ethylamine starting materials are either known to the art or can be prepared as follows:

$$Ar-Y-H + ClCH_2CN \rightarrow Ar-Y-CH_2CN$$
$$\rightarrow Ar-Y-CH_2CH_2NH_2$$

The terms Ar and Y are as defined hereabove.

The aromatic compound is reacted with chloroacetonitrile in the presence of a base such as anhydrous potassium carbonate, sodium hydride or triethylamine and by reducing the resulting nitrile intermediate with lithium aluminum hydride.

Alternatively the phenoxyethylamine starting materials can be prepared by treating a phenol with chloroacetic acid to give the corresponding phenoxyacetic acid which is converted to the amide with ammonia, followed by reduction with lithium aluminum hydride to form the desired starting material.

Another method of preparing the amine starting materials is by reaction of the appropriate aromatic compound having the formula Ar—Y—H in which Ar and Y are as defined hereabove with an equimolar amount of an alkylene dihalide followed by treatment of the resulting halo compound with potassium phthalimide. The phthalimido derivative yields the desired amine starting material upon treatment with hydrazine.

The following examples are not limiting but will serve to illustrate the compounds of this invention and the processes for their preparation.

*Example 1*

A mixture of 2,6-xylenol (244 g.), anhydrous potassium carbonate (260 g.) and methyl ethyl ketone (350 ml.) is stirred and boiled under reflux. A solution of chloroacetonitrile (140 ml.) in methyl ethyl ketone (150 ml.) is added during one hour, boiling and stirring being continued for a further hour. The bulk of the solvent is removed under water-pump vacuo and the residue diluted with ice water and extracted several times with ether. Distillation of the ether solution gives 2,6-xylyloxy-acetonitrile, B.P. 88–92° C. (0.5–1.0 mm.).

The 2,6-xylyloxyacetonitrile (242 g.) in dry ether (300 ml.) is added to a well stirred slurry of lithium aluminum hydride (75 g.) in dry ether (600 ml.). After addition, the mixture is stirred and heated under reflux for two hours. The mixture is cooled in an ice bath and stirred while wet ether (1000 ml.) is added dropwise, followed by water (400 ml.). The mixture is filtered. The filtrate is washed with brine and exhaustively extracted with 2 N petroleum ether (1 l.), basified with 50% caustic soda solution and the base extracted into ether. Distillation of the extract under nitrogen gives 2-(2,6-xylyloxy)ethylamine as a colorless oil, B.P. 115° C. (6.5 mm.).

S-methyl isothiosemicarbazide hydriodide (14.1 g.) is dissolved in ethanol (100 ml.) and 2-(2,6-dimethylphenoxy)-ethylamine (10 g.) is added. The solution is heated under reflux for two hours. The solution is cooled, filtered and the filtrate concentrated to about half volume and carefully diluted with anhydrous ether until partly turbid. Cooling deposits a yellow solid which is taken up in warm isopropanol and allowed to stand for 24 hours. Ether is added to the warm filtrate giving a solid which is further recrystallized from isopropanol/ether giving N-amino-N'-[2-(2,6-xylyloxy)-ethyl]guanidine hydriodide, M.P. 112–115° C.

*Example 2*

A mixture of 11.3 g. of S-methyl isothiosemicarbazide hydriodide and 6.8 g. of 2-phenoxyethylamine in 100 ml. of ethanol is refluxed for 2.5 hours. Working up as in Example 1 yields N-amino-N'-(2-phenoxyethyl)guanidine hydroiodide, M.P. 87–89° C. (dec.).

The hydriodide salt is treated with sodium ethoxide in ethanol. Filtering and evaporating gives N-amino-N'-(2-phenoxyethyl)guanidine.

Treatment of this free base with ethereal hydrogen chloride gives the hydrochloride salt.

*Example 3*

An ethanol solution of 11.3 g. of S-methyl isothiosemicarbazide hydriodide is added to 9.4 g. of 2-(1-naphthyloxy)ethylamine. The resulting mixture is heated under reflux for three hours and then worked up as in Example 1 to give N-amino-N'-[2(1-naphthyloxy)ethyl]guanidine hydriodide.

Similarly using 9.4 g. of 2-(2-naphthyloxy)ethylamine the product is N-amino-N'-[2 - (2 - naphthyloxy)ethyl]-guanidine hydriodide.

The free bases are obtained by treating the hydriodide salts with sodium ethoxide in ethanol to give N-amino-N'-[2-(1-naphthyloxy)ethyl]guanidine and N-amino-N'-[2-(2-naphthyloxy)-ethyl]guanidine and N - amino - N'-[2-(2-naphthyloxy)ethyl]guanidine respectively.

*Example 4*

Nine grams of 2-(2,6-xylyloxy)propylamine is added to an ethanol solution of 11.5 g. of S-methyl isothiosemicarbazide hydriodide. Refluxing for two hours, then cooling, filtering, concentrating the filtrate, adding ether and filtering gives, after recrystallization from isopropanol/ether, N-amino-N'-[2-(2,6-xylyloxy)propyl]guanidine hydriodide.

The free base is obtained by treating the hydriodide salt with sodium ethoxide in ethanol. Treatment of the free base in ethanol with ethereal hydrogen chloride yields N-amino-N'-[2 - (2,6 - xylyloxy)propyl]guanidine-hydrochloride.

*Example 5*

A mixture of 2,6-xylenol (122 g.) potassium carbonate (900 g.) and methyl ethyl ketone (1500 ml.) is boiled and stirred under reflux during the addition of trimethylene chlorbromide (950 g.). After the addition the mixture is boiled and stirred for 48 hours, cooled, filtered and concentrated under reduced pressure. The residue is diluted with water, extracted with ether and the ether extracts washed with 10% caustic soda solution and water and the ether solution dried over potassium carbonate. Evaporation of the ether, followed by distillation of the residue gives 1-chloro-3-(2,6-xylyloxy)propane, B.P. 140–142° C./18 mm.

A solution of 1-chloro-3-(2,6-xylyloxy)propane (79.5 g.) potassium phthalimide (74.0 g.) and dimethylformamide (180 ml.) is heated at 120° C. for two hours, the mixture is then poured into ice water and the mixture left in the cold for 16 hours. The pale yellow solid formed is filtered, washed with water and dried, affording 3-(2,6-xylyloxy)propyl phthalimide, M.P. 90.5–92.5° C.

The phthalimide compound (113.6 g.) is dissolved in ethanol (500 ml.) and to the warm solution, hydrazine hydrate (57 ml.) is added. The solution is heated on the steam bath for 30 minutes, filtered and the solid washed with ethanol. The combined ethanol filtrates are concentrated in vacuo and filtered. The residual amine is converted to the hydrochloride salt with ethereal hydrogen chloride. Recrystallization from ethanol affords 3-(2,6-xylyloxy)propylamine hydrochloride, M.P. 206–207° C. The free base is obtained by neutralizing an aqueous solution of the hydrochloride salt.

A mixture of 4.5 g. of 3-(2,6-xylyloxy)propylamine and 6.0 g. of S-methyl isothiosemicarbazide hydriodide in ethanol is heated under reflux for two hours. Working up as in Example 1 given N-amino-N'-[3-(2,6-xylyloxy)-propyl]guanidine hydriodide.

*Example 6*

A mixture of sodium cyanide (13.35 g.) and dimethylsulfoxide (120 ml.) is heated with stirring to an internal temperature of 80° C. and 1-chloro-3-(2,6-xylyloxy)propane (49.6 g. see Example 5) is added over 20 minutes. After addition the mixture is slowly heated to a temperature of 135° C. and maintained at this temperature for 10 minutes. After cooling the mixture is diluted with water (300 ml.) and extracted three times with ether. The combined ether extracts are washed with water and 6 N hydrochloric acid (50 ml.) followed by two more water washings. The ether solution is then dried over calcium chloride, concentrated and distilled to give 1-cyano-3-(2,6-xylyloxy)propane, B.P. 104° C./0.5 mm.

The nitrile (39.5 g.) is reduced with lithium aluminum hydride (7.94 g.) in dry ether according to the method described in Example 1 to give 4-(2,6-xylyloxy)butylamine, B.P. 93–94° C.%0.25 mm.

To an ethanol solution of 11.5 g. of S-methyl isothiosemicarbazide hydriodide is added 9.6 g. of 4-(2,6-xylyloxy)butylamine. Refluxing the resulting solution for two hours and working up as in Example 1 gives N-amino-N'-[4-(2,6 - xylyloxy)butyl]guanidine hydriodide.

*Example 7*

Reacting 2,6-diethylphenol with chloroacetonitrile in the presence of anhydrous potassium carbonate using methyl ethyl ketone as solvent by the procedure of Example 1 gives 2-(2,6-diethylphenoxy)ethylamine.

Nine grams of 2-(2,6-diethylphenoxy)ethylamine is added to an ethanol solution of 11.0 g. of S-methyl isothiosemicarbazide hydriodide. The mixture is refluxed for 2.5 hours and worked up as in Example 1 to furnish N - amino - N' - [2-(2,6-diethylphenoxy)ethyl]guanidine hydriodide.

*Example 8*

Using the procedure of Example 1, 2,6-diisopropylphenol is reacted with chloroacetonitrile and the resulting nitrile is reduced with lithium aluminum hydride to give 2-(2,6-diisopropylphenoxy)ethylamine.

An ethanol solution of 11.5 g. of S-methyl isothiosemicarbazide hydriodide is treated with 11.0 g. of 2-(2,6-diisopropylphenoxy)ethylamine and the resulting solution is refluxed for four hours to give N-amino-N'-[2-(2,6-diisopropylphenoxy)ethyl]guanidine hydriodide.

*Example 9*

According to the method of Example 1, 2,6-dimethylthiophenol is reacted with chloroacetonitrile and the resulting intermediate is reduced to give 2-(2,6-dimethylphenylmercapto)ethylamine.

A mixture of 11.3 g. of S-methyl isothiosemicarbazide hydriodide and 9.0 g. of 2-(2,6-dimethylphenylmercapto)ethylamine in ethanol is refluxed for two hours. The product is recrystallized from isopropanol/ether to give N-amino-N'-[2 - (2,6 - dimethylphenylmercapto)ethyl]-guanidine hydriodide.

The free base is obtained by treating the hydriodide salt with sodium ethoxide in ethanol. A sample of N-amino-N'-[2 - (2,6 - dimethylphenylmercapto)ethyl]-guanidine in ethanol is reacted with an equimolar amount of maleic acid to yield the maleate salt.

*Example 10*

2-(2,6-dichlorophenylmercapto)ethylamine is prepared by reacting 2,6-dichlorothiophenol and chloroacetonitrile and reducing the product with lithium aluminum hydride.

A mixture of 11.0 g. of 2-(2,6-dichlorophenylmercapto)ethylamine and 11.3 g. of S-methyl isothiosemicarbazide hydriodide is refluxed in ethanol for 1.5 hours. Working up as in Example 1 gives N-amino-N'-[2-(2,6-dichlorophenylmercapto)ethyl]guanidine hydriodide.

Similarly using 2,4,6-trichlorothiophenol, 2-ethoxythiophenol and 4-fluorothiophenol in place of 2,6-dichlorothiophenol in the procedure described above gives N-amino-N'-[2 - (2,4,6 - trichlorophenylmercapto)ethyl]-guanidine hydriodide, N-amino-N'-[2-(2-ethoxyphenylmercapto)ethyl]guanidine hydriodide and N-amino-N'-[2-(4 - fluorophenylmercapto)ethyl]guanidine hydriodide respectively.

*Example 11*

2,6-dibromophenol is reacted with chloroacetonitrile in methyl ethyl ketone using anhydrous potassium carbonate. The resulting nitrile is isolated as in Example 1 and reduced with lithium aluminum hydride in ether to give 2-(2,6-dibromophenoxy)ethylamine.

To an ethanol solution of 11.3 g. of S-methyl isothiosemicarbazide hydriodide is added 15.7 g. of 2-(2,6-dibromophenoxy)ethylamine. The mixture is refluxed for two hours. Working up as in Example 1 gives N-amino-N'-[2-(2,6-dibromophenoxy)ethyl]guanidine hydriodide.

Treating this hydriodide salt with sodium ethoxide gives, after filtering and concentrating, N-amino-N'-[2-(2,6-dibromophenoxy)ethyl]guanidine.

*Example 12*

Reacting mesitol with chloroacetonitrile and reducing the reaction product with ethereal lithium aluminum hydride yields 2-mesityloxyethylamine.

Nine grams of 2-mesityloxyethylamine is added to 11.5 g. of S-methyl isothiosemicarbazide hydriodide in ethanol. Refluxing for 2.5 hours and working up as in Example 1 gives N-amino-N'-(2-mesityloxyethyl)guanidine hydriodide.

*Example 13*

Ten grams of 2-(4-chloro - 2,6 - xylyloxy)ethylamine (prepared as in Example 1 from 4-chloro-2,6-xylenol and chloroacetonitrile) is added to an ethanol solution of 11.5 g. of S-methyl isothiosemicarbazide hydriodide. After the mixture is refluxed for two hours and worked up as in Example 1, N-amino-N'-[2-(4-chloro-2,6-xylyloxy)-ethyl]guanidine hydriodide is obtained.

*Example 14*

Chloroacetonitrile (45.5 g.) is added to the mixture of N-methyl aniline (50.35 g.) potassium carbonate (70 g.) in toluene (200 ml.), with stirring. After addition, the mixture is heated under reflux with stirring for 24 hours and filtered. The filtrate is concentrated in vacuo and the residue is distilled affording N-methyl-N-cyanomethyl aniline, B.P. 103–108° C. at 0.2 mm.

The nitrile is reduced with lithium aluminum hydride in ether according to the method described in Example 1. N-methyl-N-phenylethylenediamine, B.P. 128° C./10 mm. is obtained.

To 11.5 g. of S-methyl isothiosemicarbazide hydriodide in ethanol is added 7.5 g. of N-methyl-N-phenylethylenediamine. Refluxing for three hours and working up as in Example 1 gives N-amino-N'-[2-(N-methyl-N-phenylamino)ethyl]guanidine hydriodide.

*Example 15*

A solution of 2,6-dimethyl aniline (121 g.), formic acid (100 g.) and water is distilled through a distillation column. The residue solidifies on cooling and is treated with petroleum ether and filtered. Recrystallization from benzene-petroleum ether gives 2,6-dimethyl-N-formanilide, M.P. 172–175° C.

A mixture of 2,6-dimethyl-N-formanilide (25 g.), potassium carbonate (25 g.) and methyl ethyl ketone (100 ml.) is stirred and refluxed for one hour. Chloroacetonitrile (13.3 g.) is then added and the mixture refluxed for a further four hours.

The mixture is cooled, filtered and the solid washed with methyl ethyl ketone. The combined filtrates are concentrated in vacuo leaving an oil containing some solid. The oil is filtered using a little benzene and the filtrate is concentrated leaving N-cyanomethyl - N - formyl-2,6-dimethyl aniline as a brown oil.

The oil is reduced directly with lithium aluminum hydride in ether, using the procedure described in Example 1 to give N-methyl-N-(2,6-xylyl)ethylenediamine, B.P. 80–88° C./0.07 mm.

N-methyl - N - (2,6-xylyl)ethylenediamine (4.9 g.) is added to 5.7 g. of S-methyl isothiosemicarbazide hydriodide in 50 ml. of ethanol. Refluxing for three hours and working up the reaction mixture as in Example 1 gives N-amino-N'-{2-[N-methyl - N - (2,6 - xylyl)amino]ethyl} guanidine hydriodide.

Treating this hydriodide salt with sodium ethoxide in ethanol gives N - amino - N'-{2-[N-methyl-N-(2,6-xylyl) amino]ethyl} guanidine.

*Example 16*

By the procedure of Example 1, 2-(4-chlorophenoxy)-ethylamine (8.5 g.) and S-methyl isothiosemicarbazide hydriodide (11.5 g.) are refluxed in ethanol to give N-amino-N'-[2-(4-chlorophenoxy)ethyl]guanidine hydriodide.

*Example 17*

According to the method of Example 1, 2,6-dimethoxyphenol is reacted with chloroacetonitrile and the resulting product is reduced with lithium aluminum hydride to give 2-(2,6-dimethoxyphenoxy)ethylamine.

Refluxing a mixture of 5.0 g. of 2-(2,6-dimethoxy-phenoxy)ethylamine and 6.0 g. of S-methyl isothiosemicarbazide hydriodide in ethanol and working up the resulting mixture gives N-amino - N' - [-(2,6-dimethoxyphenoxy) ethyl]guanidine hydriodide.

*Example 18*

To an ethanol solution of 11.0 g. of S-methyl isothiosemicarbazide hydriodide is added 8.2 g. of N-(2,6-xylyl) ethylenediamine (prepared by treating 2,6-dimethyl aniline with bromo-ethyl phthalimide and cleaving the resulting phthalimide intermediate with hydrazine). The mixture is heated under reflux for 2.5 hours. Working up as in Example 1 gives N-amino-N'-[2-(2,6-xylylamino) ethyl]guanidine hydriodide.

*Example 19*

N-butyl-3-chloroaniline is reacted with chloroacetonitrile and the resulting nitrile is reduced to give N-butyl-N-(3-chlorophenyl)ethylenediamine.

A mixture of 5.0 g. of N-butyl-N-(3-chlorophenyl)-ethylenediamine and 5.2 g. of S-methyl isothiosemicarbazide hydriodide in ethanol is refluxed for three hours. The product is N-amino N'-{2-[N-butyl-N-(3-chlorophenyl)amino]ethyl} guanidine hydriodide.

Example 20

Following the procedure of Example 1 and using in place of 2,6-xylenol the following compounds:

o-Cresol
4-methoxyphenol, and
2-bromophenol these compounds are obtained as their hydriodide salts:

N-amino-N'-[2-(2-tolyloxy)ethyl]guanidine
N-amino-N'-[2-(4-methoxyphenoxyethyl]guanidine, and
N-amino-N'-[2-(2-bromophenoxy)ethyl]guanidine

What is claimed is:
1. A chemical compound of the class consisting of a free base and its addition salts with pharmaceutically acceptable acids, said free base having the formula:

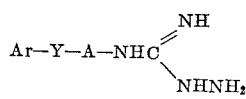

in which:
Ar is a member selected from the group consisting of naphthyl and

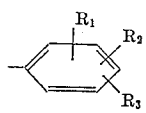

Y is a member of the group consisting of O, S and NR;
A is an alkylene chain of 2 to 4 carbon atoms having at least 2 carbon atoms separating the hetero atoms to which it is attached;
R is a member of the group consisting of hydrogen and lower alkyl; and
$R_1$, $R_2$ and $R_3$ are members selected from the group consisting of hydrogen, lower alkyl, lower alkoxy and halogen having an atomic weight of less than 80.

2. A chemical compound of the formula:

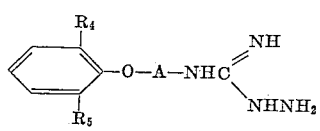

in which:
$R_4$ and $R_5$ are lower alkyl and
A is an alkylene chain of 2 to 4 carbon atoms having at least 2 carbon atoms separating the hetero atoms to which it is attached.

3. A chemical compound of the formula:

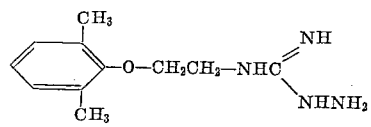

4. A chemical compound of the formula:

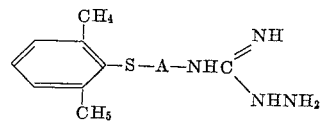

in which:
$R_4$ and $R_5$ are lower alkyl and
A is an alkylene chain of 2 to 4 carbon atoms having at least 2 carbon atoms separating the hetero atoms to which it is attached.

5. A chemical compound of the formula:

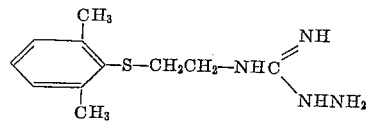

6. A chemical compound of the formula:

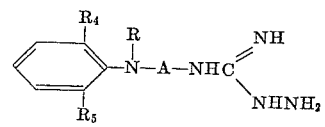

in which:
R, $R_4$ and $R_5$ are lower alkyl and
A is an alkylene chain of 2 to 4 carbon atoms having at least 2 carbon atoms separating the hetero atoms to which it is attached.

7. A chemical compound of the formula:

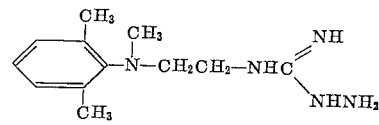

8. A chemical compound of the formula:

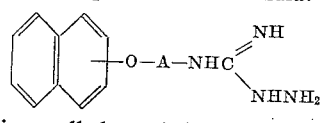

in which A is an alkylene chain of 2 to 4 carbon atoms having at least 2 carbon atoms separating the hetero atoms to which it is attached.

References Cited in the file of this patent
FOREIGN PATENTS
506,282    Germany _____ Aug. 21, 1930

OTHER REFERENCES

Kuroda: C.A., vol. 28, p. 7362 (1934).
Baltzly et al.: J.A.C.S., vol. 64, pp. 2231 to 2232 (1942).
Conant et al.: "The Chemistry of Organic Compounds," 4th ed., 335 (1952).
Finnegan et al.: J. Org. Chem., vol. 18, pp. 779–791 (1953).
Scott et al.: J.A.C.S., vol. 75, pp. 4053–4054 (1953).
Mull et al.: J. Org. Chem., vol. 25, pp. 1953–1956 (1960).